US008321736B2

(12) United States Patent
Higeta et al.

(10) Patent No.: US 8,321,736 B2
(45) Date of Patent: Nov. 27, 2012

(54) TRANSMISSION SYSTEM, TRANSMISSION METHOD AND COMMUNICATION DEVICE

(75) Inventors: Masanori Higeta, Kawasaki (JP); Kenji Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 836 days.

(21) Appl. No.: 12/410,074

(22) Filed: Mar. 24, 2009

(65) Prior Publication Data

US 2009/0249152 A1 Oct. 1, 2009

(30) Foreign Application Priority Data

Mar. 25, 2008 (JP) ................. 2008-078875

(51) Int. Cl.
G06F 11/00 (2006.01)
(52) U.S. Cl. ......... 714/748; 714/715; 714/749; 714/750
(58) Field of Classification Search .................. 714/748, 714/715, 738, 749, 750
See application file for complete search history.

(56) References Cited

U.S. PATENT DOCUMENTS

| 4,829,524 A | 5/1989 | Yoshida | |
|---|---|---|---|
| 2005/0210355 A1* | 9/2005 | Itoh et al. ........................ | 714/748 |
| 2007/0245202 A1* | 10/2007 | Kim et al. ........................ | 714/748 |
| 2008/0022178 A1* | 1/2008 | Kim et al. ........................ | 714/748 |
| 2008/0052589 A1* | 2/2008 | Shinohara et al. ............. | 714/748 |

FOREIGN PATENT DOCUMENTS

| JP | 61-198870 A | 9/1986 |
|---|---|---|
| JP | 62-026948 A | 2/1987 |
| JP | 01-180161 A | 7/1989 |
| JP | 05-167679 A | 7/1993 |
| JP | 06-245048 A | 9/1994 |
| JP | 2006-050102 A | 2/2006 |

* cited by examiner

Primary Examiner — Scott Baderman
Assistant Examiner — Sarai Butler
(74) Attorney, Agent, or Firm — Westerman, Hattori, Daniels & Adrian, LLP

(57) ABSTRACT

A transmission method for transmitting information between a transmission device and a reception device, the method includes determining whether or not an error is detected in information from the transmission device, requesting the transmission device to re-transmit the error-detected information when an error is detected, re-transmitting information corresponding to a re-transmission request as re-transmission information from the transmission device when the re-transmission request is detected, registering the re-transmission information as a test pattern, transmitting the registered test pattern to the reception device, registering the re-transmission data received from the transmission device as a collation pattern, reading out the collation pattern corresponding to the received test pattern, and collating the test pattern and the collation pattern when a test pattern is received from the transmission device, and adjusting and setting a parameter of the reception device on the basis of a pattern collation result.

20 Claims, 14 Drawing Sheets

TRANSMISSION SYSTEM, TRANSMISSION METHOD AND COMMUNICATION DEVICE

CROSS-REFERENCE TO RELATED APPLICATION(S)

This application is based upon and claims the benefit of priority of the prior Japanese Patent Application No. 2008-78875, filed on Mar. 25, 2008, the entire contents of which are incorporated herein by reference.

FIELD

An embodiment of the present invention discussed herein relates to a transmission system.

BACKGROUND

A data transmission system for implementing data transmission/reception among electronic circuits in a computer exists. FIG. 13 is a block diagram which illustrates electronic circuits in a general computer.

A computer 50 illustrated in FIG. 13 is disposed while plural electronic circuits 50A are mounted therein. The computer 50 contains, as the plural electronic circuits 50A, plural input/output units 51 for inputting/outputting various kinds of data, plural memories 52 for storing various kinds of data, CPUs 53 for controlling various kinds of programs, a crossbar switch 54 which connects plural input/output units 51 to dynamically select a transmission route for data, and north bridges 55 for controlling data transmission among the memories 52, CPUs 53 and the crossbar switch 54.

For example, CPU 53 and the north bridge 55, the north bridge 55 and the crossbar switch 54, and the input/output unit 51 and the crossbar switch 54 are respectively connected to each other through data transmission lines, and data transmission/reception is implemented through the data transmission lines.

However, in order to enhance the performance of the computer, it is important to mutually increase the speed of data transmission between electronic circuits, that is, between a data transmission device and a data reception device. In order to increase the speed of the data transmission, the transmission waveform is deteriorated due to signal reflection or transmission loss, and it has been required to implement data transmission under an environment having a very severe margin.

In order to implement high-speed data transmission, retraining processing has become popular as a technique of adjusting and setting circuit control parameters of a data transmission device and a data reception device to optimum values in accordance with the environment.

Therefore, there is known a data transmission system having a retraining function of adjusting and setting the circuit control parameters of the data reception device in accordance with the environment so as to implement high-speed data transmission between electronic circuits, that is, between the data transmission device and the data reception device. FIG. 14 is a block diagram showing the schematic internal construction of a data transmission system as described above.

The data transmission system 100 shown in FIG. 14 has a data transmission device 102 for transmitting data, a data reception device 103 for receiving data from the data transmission device 102, and a data transmission line 104 through which the data transmission device 102 and the data reception device 103 are connected.

Next, the operation of the data transmission system 100 will be described.

When detecting a retraining signal, the data transmission device 102 starts to execute the retraining processing, reads out a fixed test pattern stored in the data transmission device 102, and transmits the read-out fixed test pattern through a data transmission line 104A to the data reception device 103.

When receiving the fixed test pattern from the data transmission device 102, the data reception device 103 reads out a collation pattern which is stored in the data reception device 103 and corresponds to the received fixed test pattern.

Then, the data reception device 103 collates the fixed test pattern received from the data transmission device 102 with the collation pattern stored in the data reception device 103.

When the fixed test pattern is coincident with the collation pattern, it is determined that the circuit parameter of the data reception device 103 is an optimum value, and the retraining processing is finished.

When the fixed test pattern is not coincident with the collation pattern, the circuit parameter is adjusted and set so that the fixed test pattern and the collation pattern are coincident with each other to set the circuit parameter of the data reception device 103 to the optimum value, whereby the circuit parameter of the data reception device 103 is set to the optimum value.

[Patent Document] JP-A-5-167679
[Patent Document] JP-A-2006-50102

However, in the data transmission system 100, the fixed test pattern and the collation pattern corresponding to the fixed test pattern which are used in the retraining processing are predetermined fixed patterns. When the test pattern and the collation pattern are not a test pattern and a collation pattern which are suitable for a system environment temperature at which the data transmission system is in operation and a device production variation, it is difficult to adjust and set the circuit parameter of the optimum data reception device which is adaptive to the system environment temperature and the device production variation.

An object of the present invention is to implement a system environment suitable for high-speed data transmission by using re-transmission data under operation as a test pattern and a collation pattern and adjusting and setting a circuit parameter of an optimum data reception device which is adaptive to a system environment temperature under operation and a device production variation.

SUMMARY

According to an aspect of the invention, a transmission method for transmitting information between a transmission device and a reception device, the method includes determining whether or not an error is detected in information from the transmission device, requesting the transmission device to re-transmit the error-detected information when an error is detected, re-transmitting information corresponding to a re-transmission request as re-transmission information from the transmission device when the re-transmission request is detected, registering the re-transmission information as a test pattern, transmitting the registered test pattern to the reception device, registering the re-transmission data received from the transmission device as a collation pattern, reading out the collation pattern corresponding to the received test pattern, and collating the test pattern and the collation pattern when a test pattern is received from the transmission device, and adjusting and setting a parameter of the reception device on the basis of a pattern collation result.

DESCRIPTION OF EMBODIMENTS

A data transmission system, a data transmission method, a data transmission device and a data reception device according to embodiments of the present invention will be hereunder described in detail with reference to the drawings. It is needless to say that the technical content of the embodiment discussed herein does not directly limit the technical scope of the present invention.

In the embodiments, re-transmission data is used as a test pattern and/or a collation pattern when processing a retraining operation. The re-transmission data is transmitted when an error of data to be normally transmitted between a data transmission device and a data reception device is detected. Thereby, a circuit parameter of the data reception device which is suitable for a system environment temperature and a device production variation at the detection time of the data error can be adjusted and set.

Figure 1:
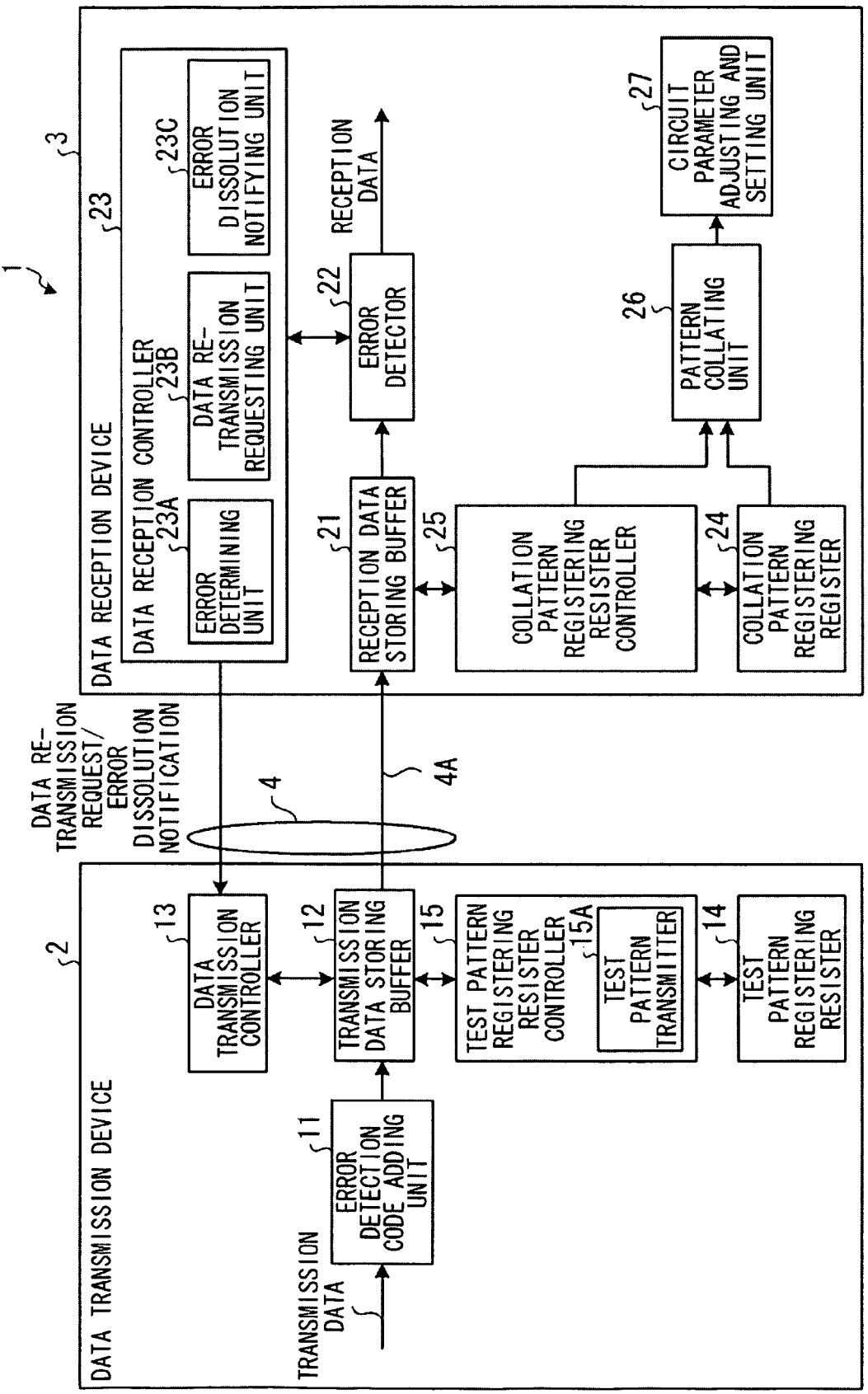
FIG. 1 is a block diagram illustrating a data transmission system according to a first embodiment of the invention.

FIG. 1 is a block diagram illustrating a data transmission system according to an embodiment of the present invention.

The data transmission system 1 illustrated in FIG. 1 has a data transmission device 2 for transmitting data, a data reception device 3 for receiving data sent from the data transmission device 2, and a data transmission line 4 connecting the data transmission device 2 and the data reception device 3 to each other.

The data transmission device 2 has an error detecting code adding unit 11 for adding an error detecting code to the transmission data, and a transmission data storing buffer 12 for successively storing the transmission data. The error detecting code is added by the error detecting code adding unit 11 to successively transmit the transmission data to the data reception device 3.

The transmission data storing buffer 12 has a storage capacity at which a certain amount of transmission data can be stored. The transmission data storing buffer 12 stores transmission data while successively receiving the transmission data, and when the amount of the transmission data stored in the transmission data storing buffer 12 exceeds a certain amount, the transmission data storing buffer 12 deletes the stored transmission data from the oldest transmission data, and transmission data of the certain amount can be stored and held in the transmission data buffer 12 from the latest transmission data. That is, even after the transmission data is transmitted to the data reception device 3, the transmission data storing buffer 12 stores and holds the transmission data in accordance with the capacity thereof.

The data transmission device 2 has a data transmission controller 13 for controlling the transmission data storing buffer 12 so that the transmission data stored in the transmission data storing buffer 12 is successively transmitted to the data reception device 3 through the data transmission line 4A in the data transmission line 4. The data transmission device 2 further has a test pattern register 14 for registering a test pattern used in the retraining process, and a test pattern register controller 15 for controlling the test pattern register 14.

The data reception device 3 has a reception data storing buffer 21 for successively storing received data which is successively received from the data transmission device 2 through the data transmission line 4A. The data reception device 3 further has an error detector 22 for detecting an error detecting code in the received data successively stored in the reception data storing buffer 21, and detecting the presence or absence of an error of the received data on the basis of the detection result of the error detecting code.

The reception data storing buffer 21 has a storage capacity at which a certain amount of received data can be stored and held. The reception data storing buffer 21 stores received data sent from the data transmission device 2 while successively receiving the data. When the amount of the received data stored in the reception data storing buffer 21 exceeds a certain amount, the reception data storing buffer 21 successively deletes the received data stored therein from the oldest reception data, and the received data of the certain amount can be stored and held from the latest received data. That is, even after the received data is transmitted to the error detector 22, the reception data storing buffer 21 stores and holds the received data in accordance with the capacity thereof.

The error detector 22 detects the error detecting code from the received data received through the reception data storing buffer 21. When no error is detected in the received data, the error detector 22 transmits the reception data to a subsequent-stage site (not shown).

The data reception device 3 has a data reception controller 23 for notifying the data transmission device 2 of a data re-transmission request for requesting re-transmission of the received data in which an error is detected by the error detector 22 when the error is detected in the received data by the error detector 22. The data reception device 3 further has a collation pattern register 24 for registering a collation pattern corresponding to a test pattern used in the retraining process, and a collation pattern register controller 25 for controlling the collation pattern register 24.

The data reception device 3 has a pattern collating unit 26 for reading out from the collation pattern register 24 the collation pattern corresponding to the test pattern received from the data transmission device 2 through the reception data storing buffer 21, and collating the collation pattern and the test pattern with each other. The data reception device 3 further has a circuit parameter adjusting and setting unit 27 for adjusting and setting a circuit parameter in the data reception device 3 on the basis of a collation result of the pattern collating unit 26.

The data reception controller 23 has an error determining unit 23A for determining whether or not an error in the received data is detected by the error detector 22, and a data re-transmission requesting unit 23B for notifying the data transmission device 2 of a data re-transmission request for requesting re-transmission of the received data in which the error is detected by the error determining unit 23A. The data reception controller 23 further has an error dissolution notifying unit 23C for notifying an error dissolution notification to the data transmission device 2 when no error in the received data is detected in the error determining unit 23A.

The data transmission controller 13 of the data transmission device 2 controls the transmission data storing buffer 12 when the data transmission controller 13 detects the data re-transmission request from the data reception device 3, so that transmission data corresponding to a re-transmission request are read out from the transmission data storing buffer 12, and then the read-out transmission data are transmitted as re-transmission data to the data reception device 3. When an error in the re-transmission data is detected in the error determining unit 23A, the data re-transmission request unit 23B notifies the data re-transmission request of the re-transmission data to the data transmission device 2 again.

The test pattern register controller 15 temporarily registers re-transmission data into the test pattern register 14 when the data transmission controller 13 transmits the re-transmission data to the data reception device 3 in response to the data re-transmission request from the data reception device 3.

When the data reception device 3 detects no error in the re-transmission data, that is, an error dissolution notification from the data reception device 3 involved with the re-transmission is detected through the data transmission controller 13, the test pattern register controller 15 registers the temporarily registered re-transmission data as a test pattern into the test pattern register 14. When the data reception device 3 detects an error in the re-transmission data, that is, a data re-transmission request of the re-transmission data from the data reception device 3 is detected through the data transmission controller 13, the test pattern register controller 15 maintains the temporary registration of the temporarily registered re-transmission data without registering the temporarily-registered re-transmission data in the test pattern register 14.

When execution of the retraining process is started through the data transmission controller 13, the test pattern register controller 15 reads out the registered test pattern into the test pattern register 14, and transmits the read-out test pattern through the transmission data storing buffer 12 to the data reception device 3. When detecting a retraining signal every certain time period, the data transmission controller 13 starts the execution of the retraining process.

When the re-transmission data is received from the data transmission device 2 through the reception data storing buffer 21, the collation pattern register controller 25 temporarily registers the received re-transmission data as the collation pattern corresponding to the test pattern into the collation pattern register 24.

When no error in the re-transmission data is detected in the error determining unit 23A, the collation pattern register controller 25 registers the re-transmission data being temporarily registered in the collation pattern register 24 as a collation pattern. When an error in the re-transmission data is detected in the error determining unit 23A, the collation pattern register controller 25 maintains the temporary registration of the re-transmission data being temporarily registered without registering the temporarily registered re-transmission data into the collation pattern register 24.

When the re-transmission data is transmitted from the data transmission device 2 to the data reception device 3, the test pattern which has been registered in the test pattern register 14 and the collation pattern which has been registered in the collation pattern register 24 are the same re-transmission data.

When receiving the test pattern from the data transmission device 2, the pattern collating unit 26 reads out the collation pattern corresponding to the received test pattern from the collation pattern register 24, and collates the read-out collation pattern with the test pattern. The pattern collating unit 26 notifies the circuit parameter adjusting and setting unit 27 of a collation result of the pattern collating unit 26 indicating whether the test pattern and the collation pattern are coincident with each other or not.

When the test pattern and the collation pattern are coincident with each other on the basis of the collation result of the pattern collating unit 26, the circuit parameter adjusting and setting unit 27 determines that the circuit parameter of the data reception device 3 at that time point is optimum.

When the test pattern and the collation pattern are not coincident with each other on the basis of the collation result of the pattern collating unit 26, the circuit parameter adjusting and setting unit 27 determines that the circuit parameter of the data reception device 3 is not optimum, and the circuit parameter is adjusted and set so that the test pattern and the collation pattern are coincident with each other. The circuit parameter corresponds to a reception clock phase of the data reception device 3, a terminating register value, etc.

The operation of the data transmission system 1 according to the first embodiment will be described.

Figure 2:
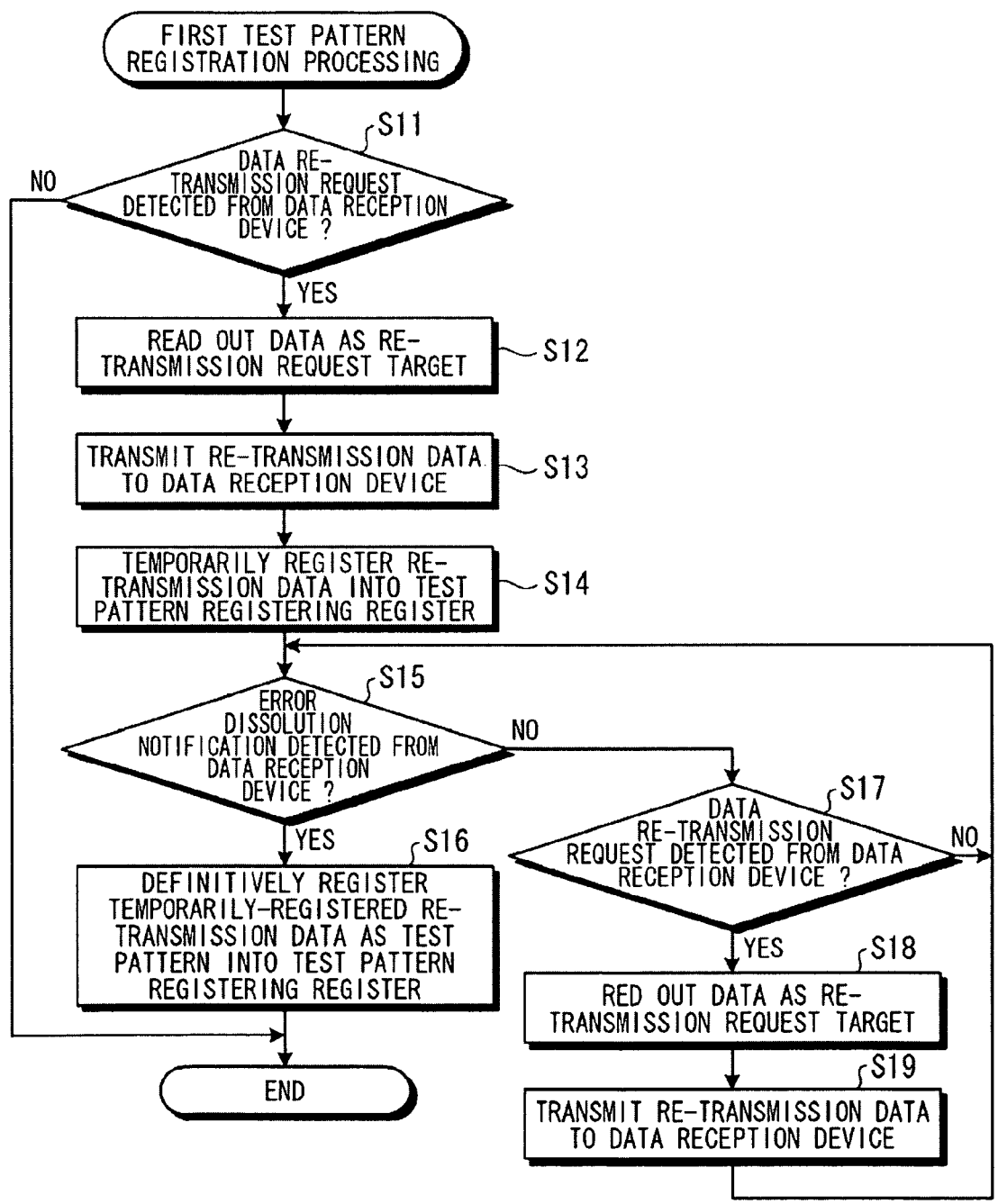
FIG. 2 is a flowchart illustrating an operation of a data transmission device involved with first test pattern registration processing of the first embodiment.

The first test pattern registration process operated by the data transmission device 2 will be described. FIG. 2 is a flowchart illustrating a process corresponds to an operation of the data transmission device 2 involved with the first test pattern registration process according to the first embodiment.

The first test pattern registration process illustrated in FIG. 2 is a process to register (not a temporary-registration) the re-transmission data at the detection time of an error as a test pattern into the test pattern register 14.

In FIG. 2, the data transmission controller 13 of the data transmission device 2 determines whether the data re-transmission request is detected from the data re-transmission requesting unit 23B of the data reception device 3 (S11).

When detecting the data re-transmission request from the data reception device 3 (S11: Yes), the data transmission controller 13 reads out the transmission data as a re-transmission request target from the transmission data storing buffer 12 (S12), and transmits the read-out transmission data as re-transmission data to the data reception device 3 through the data transmission line 4A (S13).

The test pattern register controller 15 transmits the re-transmission data to the data reception device 3, and then temporarily registers the transmitted re-transmission data into the test pattern register 14 (S14).

Thereafter, the data transmission controller 13 of the data transmission device 2 determines whether the error dissolution notification is detected or not through the error dissolution notifying unit 23C of the data reception device 3 (S15).

When the data transmission controller 13 detects the error dissolution notification (S15: Yes), the test pattern register controller 15 registers the temporarily-registered re-transmission data as a test pattern into the test pattern register 14 (S16), and then finishes the process of FIG. 2.

When the data transmission controller 13 does not detect any error dissolution notification corresponding to the re-transmission data transmission through the error dissolution notifying unit 23c of the data reception device 3 (S15: No), the data transmission controller 13 determines whether the data re-transmission request is detected through the data re-transmission requesting unit 23B of the data reception device 3 or not (S17).

When detecting the data re-transmission request from the data reception device 3 (S17: Yes), the data transmission controller 13 determines that the data reception device 3 detects an error in the re-transmission data, and reads out the transmission data as the re-transmission request target from the transmission data storing buffer 12 with keeping the re-transmission data being temporarily registered in the test pattern register 14 (S18). Then, the data transmission controller 13 transmits the read-out transmission data as re-transmission data through the data transmission line 4A to the data reception device 3 (S19), and shifts the process to S15 to determine again whether an error dissolution notification from the data reception device 3 is detected in accordance with the re-transmission data transmission.

When the data transmission controller 13 detects no data re-transmission request from the data reception device (S17: No), the data transmission controller 13 shifts the process to S15 to determine again whether an error dissolution notification from the data reception device 3 is detected or not.

When the data transmission controller 13 detects no data re-transmission request from the data reception device 3 (S11: No), the data transmission controller 13 finishes the process of FIG. 2.

According to the first test pattern registration process illustrated in FIG. 2, the re-transmission data corresponding to a data re-transmission request that is sent when a data error is detected and temporarily registered in the test pattern register 14. When an error dissolution notification of the re-transmission data from the data reception device 3 is detected, the re-transmission data being temporarily registered is registered as a test pattern into the test pattern register 14. Therefore, in the data transmission device 2, an optimum test pattern which is adaptive to not only the system environment temperature under operation and the device production variation, but also a severe environment in which a data error occurs can be registered in the test pattern register 14.

Furthermore, according to the first test pattern registration process, when the data re-transmission request of the re-transmission data from the data reception device 3 is detected again while the re-transmission data is temporarily registered in the test pattern register 14, the temporary registration of the re-transmission data is kept without registering the re-transmission data being temporarily registered in the test pattern register 14. Therefore, the re-transmission data for which the data error cannot be dissolved can be prevented from being registered as a test pattern.

Figure 3:
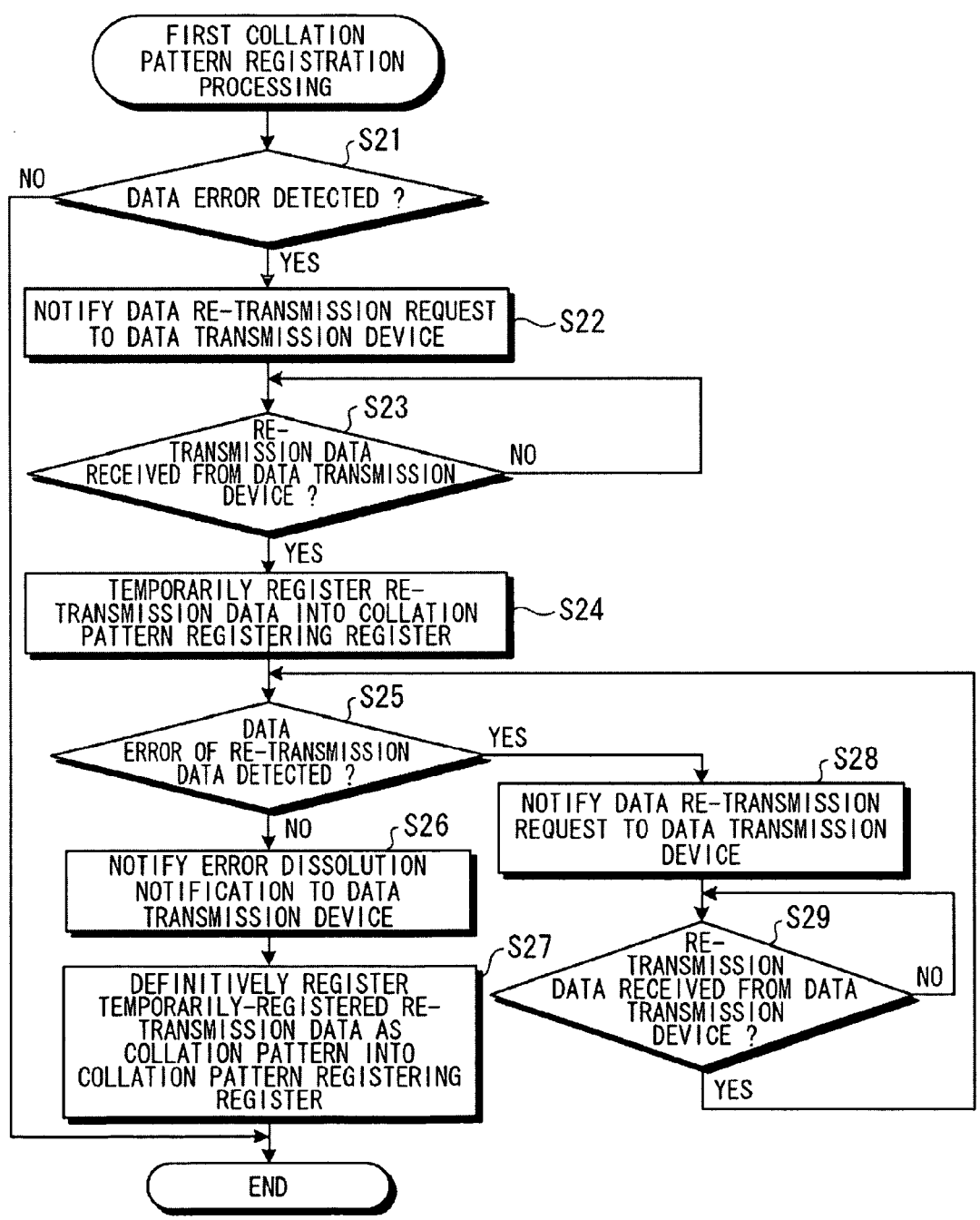
FIG. 3 is a flowchart illustrating an operation of a data reception device involved with first collation pattern registration processing according to the first embodiment.

Next, a first collation pattern registration process of the data reception device 3 will be described. FIG. 3 is a flowchart illustrating a process corresponding to an operation of the data reception device 3 involved with the first collation pattern registration process of the first embodiment.

The first collation pattern registration process illustrated in FIG. 3 is a process of registering the re-transmission data at the error detection time as the collation pattern corresponding to the test pattern into the collation pattern register 24.

In FIG. 3, the error determining unit 23A of the data reception device 3 determines whether or not any data error is detected in the received data through the error detector 22 (S21).

When the error determining unit 23A detects a data error in the received data (S21: Yes), the data re-transmission requesting unit 23B notifies the data re-transmission request for requesting the re-transmission of the received data in which data error is detected to the data transmission device 2 (S22).

Thereafter, the data reception controller 23 determines whether or not the re-transmission data corresponding to the re-transmission request is received from the data transmission device 2 through the data transmission line 4A by the reception data storing buffer 21 (S23).

When the data reception controller 23 receives the re-transmission data from the data transmission device 2 (S23: Yes), the collation pattern register controller 25 temporarily registers the received re-transmission data into the collation pattern register 24 (S24).

The error determining unit 23A determines whether a data error in the re-transmission data received in S23 is detected or not (S25).

When the error determining unit 23A does not detect any data error in the re-transmission data (S25: No), the error dissolution notifying unit 23C sends an error dissolution notification to the data transmission device 2 (S26).

The collation pattern register controller 25 registers the re-transmission data being temporarily registered in the collation pattern register 24 as a collation pattern into the collation pattern register 24 (S27), and then finishes the process of FIG. 3.

When the error determining unit 23A does not detect any data error in the received data (S21: No), the error determining unit 23A finishes the process of FIG. 3.

Furthermore, when the error determining unit 23A detects a data error in the re-transmission data (S25: Yes), the data re-transmission requesting unit 23B notifies the data re-transmission request for requesting the re-transmission of data to the data transmission device 2 (S28).

The data reception controller 23 determines whether or not the re-transmission data corresponding to the re-transmission request is received from the data transmission device 2 through the data transmission line 4A by the reception data storing buffer 21 (S29).

When the data reception controller 23 receives the re-transmission data through the reception data storing buffer 21 (S29: Yes), the data reception controller 23 shifts the process to S25 to detect the data error in the re-transmission data.

When the data reception controller 23 does not receive re-transmission data from the data transmission device 2 (S29: No), the data reception controller 23 executes the monitoring operation of S29 to determine whether the re-transmission data is received or not.

Likewise, when the data reception controller 23 does not receive re-transmission data from the data transmission device 2 (S23: No), the data reception controller 23 executes the monitoring operation of S23 to determine whether the re-transmission data is received or not.

In the first collation pattern registration process illustrated in FIG. 3, the re-transmission data corresponds to the data re-transmission request in which the data error is detected is temporarily registered in the collation pattern register 24. When no data error of the re-transmission data from the data transmission device 2 is detected, the re-transmission data being temporarily registered in the collation pattern register 24 is registered as the collation pattern. Therefore, in the data reception device 3, the collation pattern which is adaptive not only to the system environment temperature under operation and the device production variation, but also to the severe environment in which the data error occurs can be registered in the collation pattern register 24.

Furthermore, in the first collation pattern registration process, when the data error of the re-transmission data is detected while the re-transmission data is temporarily registered in the collation pattern register 24, the temporary registration of the re-transmission data is maintained without registering the temporarily-registered re-transmission data in the collation pattern register 24. Therefore, registering the re-transmission data in which corresponding data error cannot be dissolved as the collation pattern can be prevented.

As described above, according to the data transmission system 1 of the embodiment, the re-transmission data is registered as the test pattern in the test pattern register 14, in the first test pattern registration process illustrated in FIG. 2, and the re-transmission data is registered as the collation pattern corresponding to the test pattern in the collation pattern register 24 in the first collation pattern registration process shown in FIG. 3, and then the retraining process described below is executed.

Figure 4:
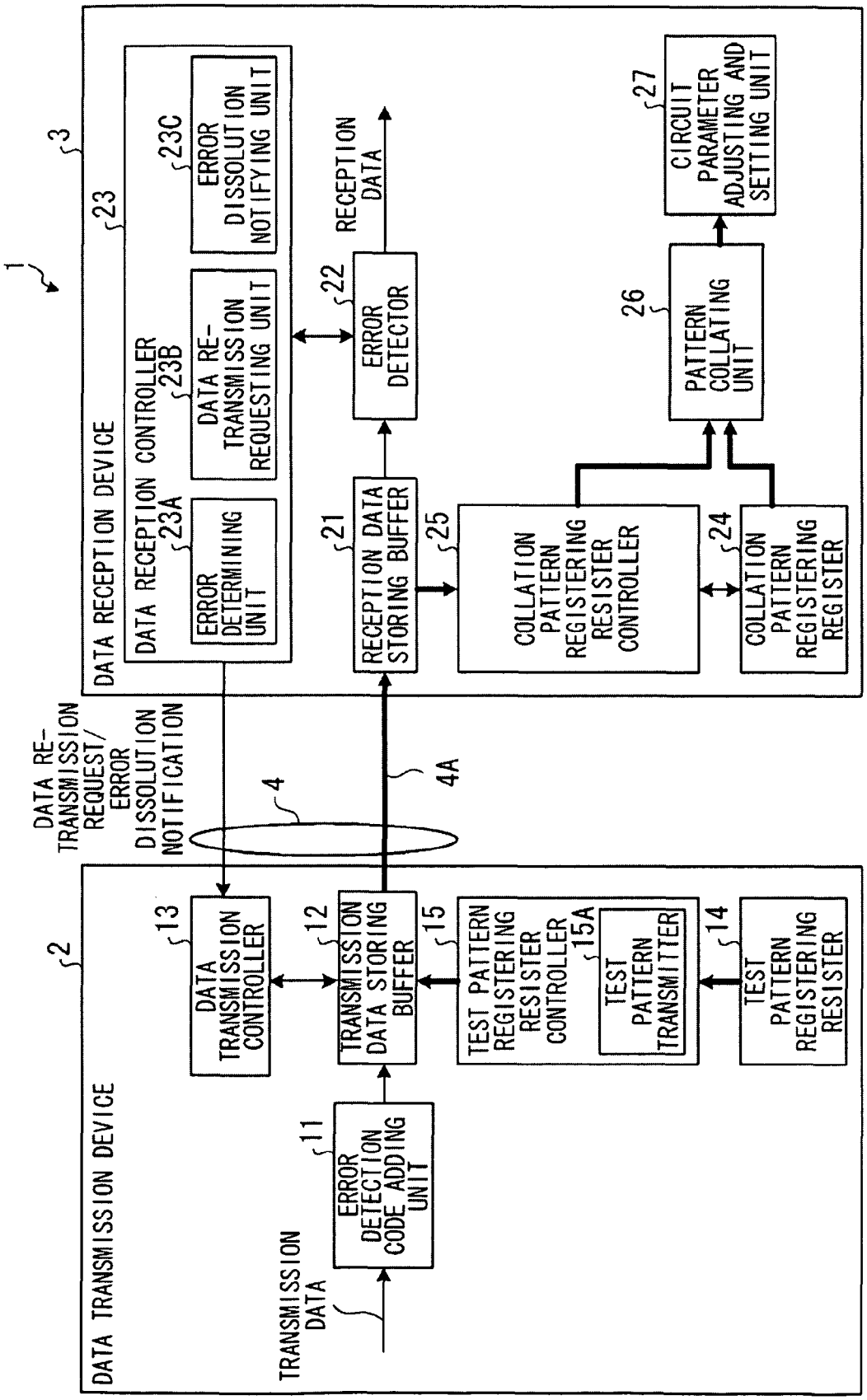
FIG. 4 is a diagram illustrating the operation of retraining processing of the first embodiment.
Figure 5:
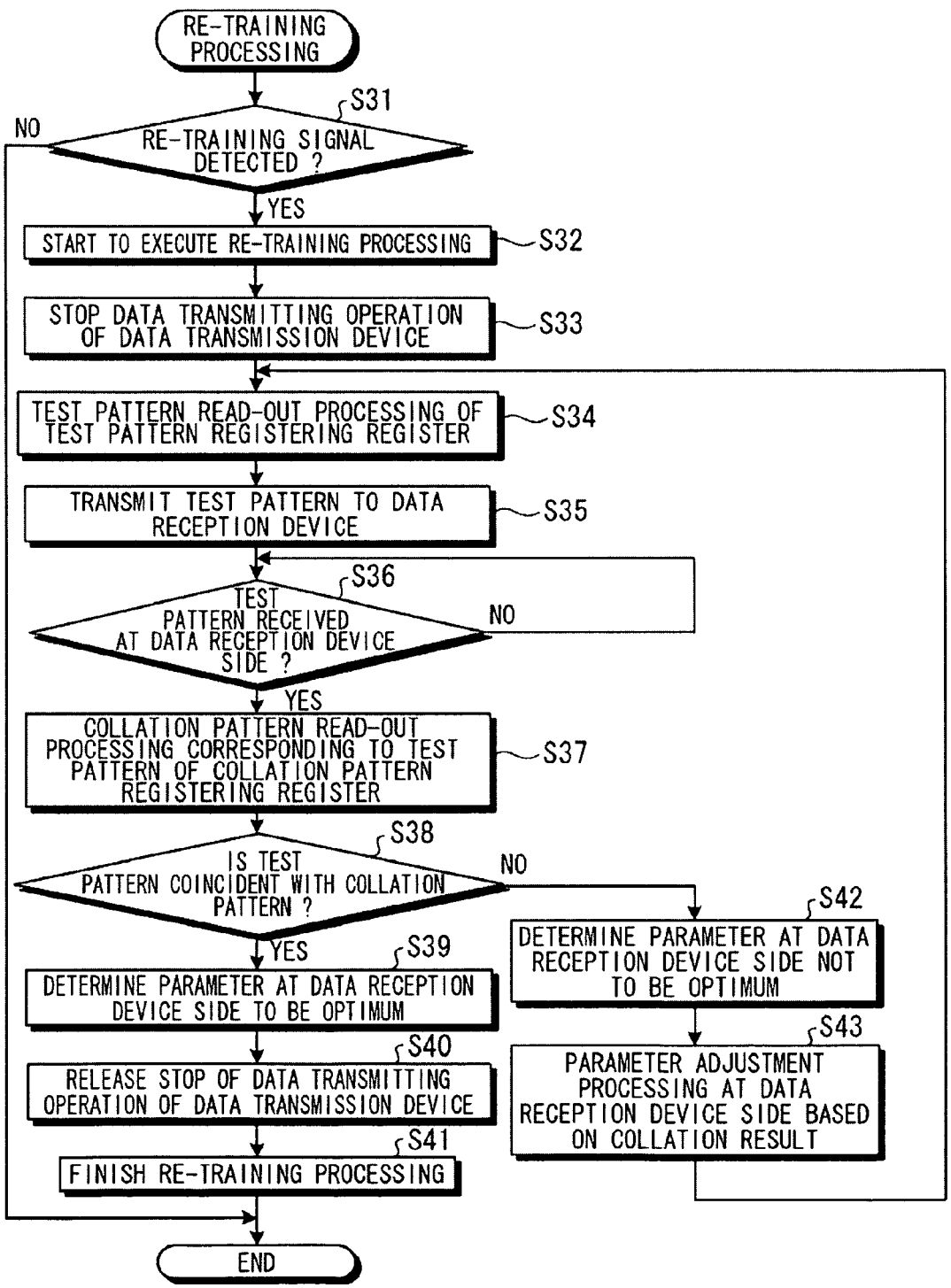
FIG. 5 is a flowchart illustrating an operation of the data transmission device and the data reception device on the retraining processing according to the first embodiment.

FIG. 4 is a diagram illustrating an operation of the retraining process associated with the first embodiment. FIG. 5 is a flowchart illustrating a process operated by the data transmission device 2 and the data reception device 3 involved with the retraining process of the first embodiment.

The retraining process illustrated in FIG. 5 is a process of collating the test pattern received from the data transmission device 2 with the collation pattern corresponding to the test pattern in the data reception device 3, and adjusting and setting the circuit parameter of the data reception device 3 on the basis of the collation result. Heavy lines illustrated in FIG. 4 represent the flow of the data of the retraining process.

The data transmission controller 13 of the data transmission device 2 illustrated in FIG. 5 determines whether a retraining signal is detected from the data reception device 3 (S31). It is assumed that the data reception device 3 generates the retraining signal every certain time period.

When the data transmission controller 13 detects the retraining signal from the data reception device 3 (S31: Yes), the data transmission controller 13 starts to execute the retraining process (S32), and temporarily stops the normal data transmission operation to the data reception device 3 (S33).

When the normal data transmission operation is temporarily stopped, the test pattern register controller 15 executes test pattern read-out process for reading out any test pattern being registered in the test pattern register 14 as described later (S34). The read-out test pattern is the re-transmission data transmitted to the data reception device 3 at the time of the previous data re-transmission.

The test pattern transmitter 15A of the test pattern register controller 15 transmits any test pattern read out in S34 to the data reception device 3 through the data transmission line 4A (S35).

The data reception device 3 determines whether the test pattern from the data transmission device 2 is received onto the reception data storing buffer 21 or not (S36).

When receiving the test pattern from the data transmission device 2 on the reception data storing buffer 21 (S36: Yes), the collation pattern register controller 25 of the data reception device 3 executes the read-out collation pattern read-out process of reading out the collation pattern corresponding to the received test pattern from the collation pattern register 24 (S37). The read-out collation pattern is the re-transmission data received from the data transmission device 2 at the previous data re-transmission time.

The pattern collating unit 26 of the data reception device 3 collates the test pattern received from the data transmission device 2 in S36 with the collation pattern corresponding to the test pattern read out from the collation pattern register 24 in S37, and determines on the basis of the collation result whether or not the test pattern and the collation pattern are coincident with each other (S38).

When the test pattern and the collation pattern are coincident with each other (S38: Yes), the circuit parameter adjusting and setting unit 27 of the data reception device 3 determines that the circuit parameter of the data reception device 3 is optimum (S39). Furthermore, the data transmission controller 13 of the data transmission device 2 releases the normal data transmission operation that is temporarily stopped in S33 (S40), and finishes the retraining process which is started to be executed in S32 (S41), thereby finishing the process of FIG. 5.

Furthermore, when the test pattern and the collation pattern are not coincident with each other (S38: No), the circuit parameter adjusting and setting unit 27 of the data reception device 3 determines that the circuit parameter of the data reception device 3 is not optimum (S42). The circuit parameter adjusting and setting unit 27 adjusts and sets the circuit parameter of the data reception device 3 on the basis of the collation result so that the test pattern is coincident with the collation pattern (S43), and shifts the process to S34 to request the data transmission device 2 to transmit a test pattern again. Subsequently, the process of S34 and subsequent steps are repeated.

When detecting no retraining signal from the data reception device 3 (S31: No), the data transmission controller 13 of the data transmission device 2 finishes the process of FIG. 5.

When the test pattern from the data transmission device 2 is not received on the reception data storing buffer 21 (S36: No), the data reception device 3 executes the monitoring operation of S36 to determine whether the test pattern is received or not.

In the retraining process illustrated in FIG. 5, the re-transmission data at the data error detection time under operation are used for the test pattern being registered in the test pattern register 14 of the data transmission device 2, and the collation pattern being registered in the collation pattern register 24 of the data reception device 3. When execution of the retraining process is started in the data transmission device 2, the test pattern is transmitted from the data transmission device 2 to the data reception device 3, the test pattern and the collation pattern corresponding to the test pattern are collated in the data reception device 3, and then the circuit parameter of the data reception device 3 is adjusted and set on the basis of the collation result. Therefore, the circuit parameter of the optimum data reception device 3 which is adaptive to not only the system environment temperature under operation and the device production variation, but also the severe environment in which the data error occurs can be adjusted and set. As a result, the system environment which is suitable for the high-speed data transmission can be implemented.

Figure 6:
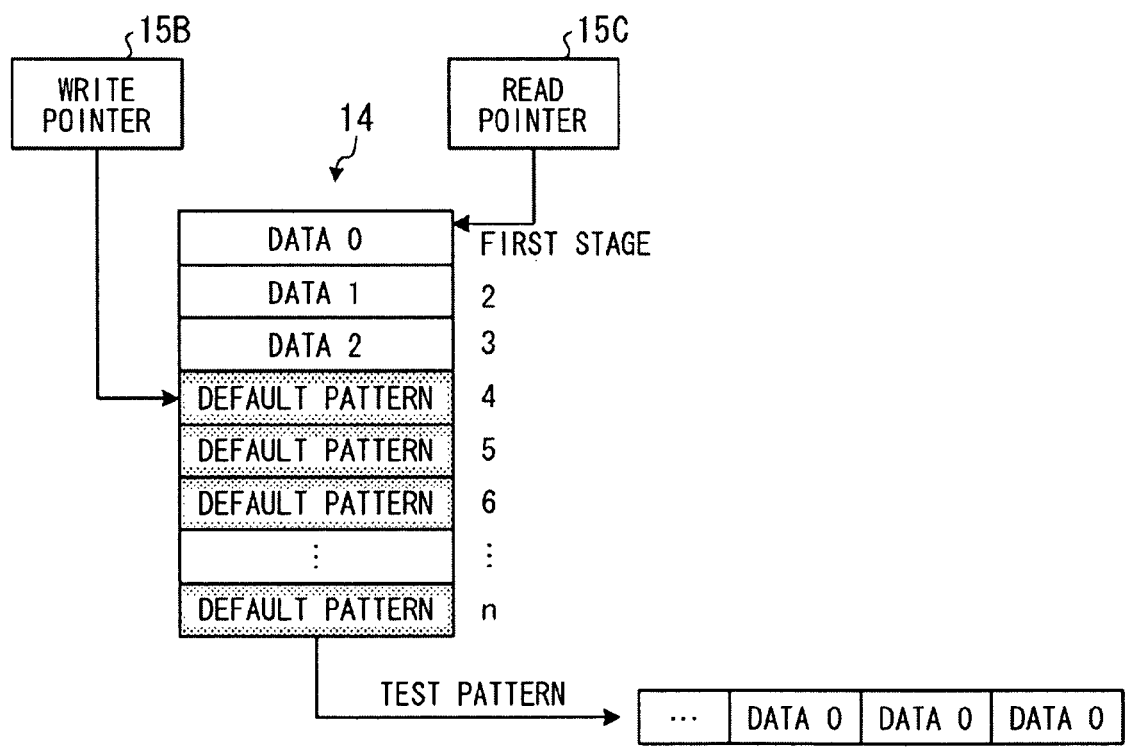
FIG. 6 is a diagram illustrating a test pattern read-out process associated with a test pattern register controller according to the first embodiment.

Next, the test pattern read-out process of the test pattern register controller 15, which is indicated in S34 of FIG. 5, will be described. FIG. 6 is a diagram illustrating an example of the test pattern read-out process associated with the test pattern register controller 15 of the first embodiment.

As illustrated in FIG. 6, the test pattern register 14 has the maximum number n of storage areas, therefore the maximum number n of test patterns can be registered in the test pattern register 14.

The test pattern register controller 15 indicates a storage area that stores a registration target to be registered by a write pointer 15B until the number of test patterns being registered in the test pattern register 14 reaches the number n, and a new test pattern is registered in the indicated storage area.

When the latest test pattern is preferentially registered in the storage area indicated by the write pointer 15B, the test pattern register controller 15 deletes the oldest test pattern stored in the test pattern register 14 when the number of the test patterns being registered exceeds the number n. It is assumed that plural default test patterns are registered in the test pattern register 14 under default state.

The test pattern register controller 15 indicates any storage area as a read-out target by a read pointer 15C, reads out a test pattern being registered in the indicated storage area and transmits the read-out test pattern to the data reception device 3.

In the test pattern read-out process illustrated in FIG. 6, the storage area at the first stage is indicated by the read pointer 15C in the test pattern register controller 15, and "data 0" being registered in the indicated storage area at the first stage is read out as a test pattern, and then the test pattern of the read-out "data 0" is transmitted to the data reception device 3.

As not shown, the collation pattern register 24 of the data reception device 3 has store areas whose maximum number is equal to n, and the collation pattern register controller 25 registers the collation pattern corresponding to the test pattern in the storage area of the collation pattern register 24 which is indicated by the write pointer, reads out the collation pattern being registered in the storage area indicated by the read pointer, and then transmits the collation pattern to the pattern collating unit 26.

The collation pattern register controller 25 reads out the collation pattern corresponding to the test pattern read out by the test pattern register controller 15. For example, when the test pattern is "data 0", the collation pattern register controller 25 reads out the collation pattern of "data 0" corresponding to the test pattern.

In the test pattern register controller 15, any test pattern can be read out from plural test patterns being registered in the test pattern register 14. Various manners may be considered for the test pattern read-out process of reading out any test pattern in plural test patterns being registered in the test pattern register 14.

Therefore, various manners of the test pattern read-out process will be described with reference to FIGS. 7 to 10.

Figure 7:
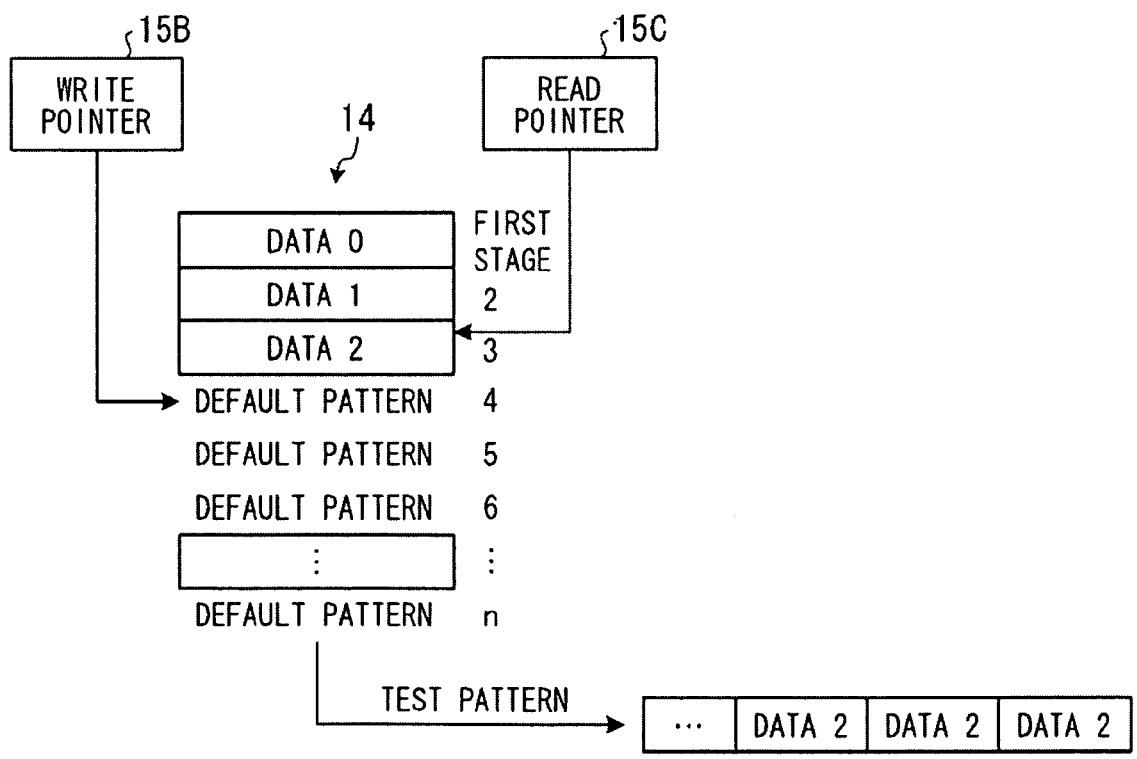
FIG. 7 is a diagram illustrating a test pattern read-out process associated with the test pattern register controller according to the first embodiment.

FIG. 7 is a diagram illustrating an example of the test pattern read-out process associated with the test pattern register controller 15 of the first embodiment. In the example of FIG. 7, the latest test pattern is readout from test patterns registered in the test pattern register 14.

In FIG. 7, the test pattern register controller 15 reads out the latest single test pattern "data 2" from plural test patterns being definitively registered in the test pattern register 14, and transmits the latest test pattern to the data reception device 3.

In the test pattern read-out process shown in FIG. 7, the retraining process is executed by using the latest test pattern in the plural test patterns, that is, the test pattern of the re-transmission data at the latest data error detection time. Therefore, the circuit parameter of the optimum data reception device 3 which is adaptive to the system environment temperature under current operation and also the severe environment when the data error occurs can be adjusted and set.

In the test pattern read-out process illustrated in FIG. 7, the latest test pattern being registered in the test pattern register 14 is read out and output. However, it is needless to say that a test pattern being registered in a certain storage area in plural storage areas, for example, in the storage area of the second stage may be read out and output.

Figure 8:
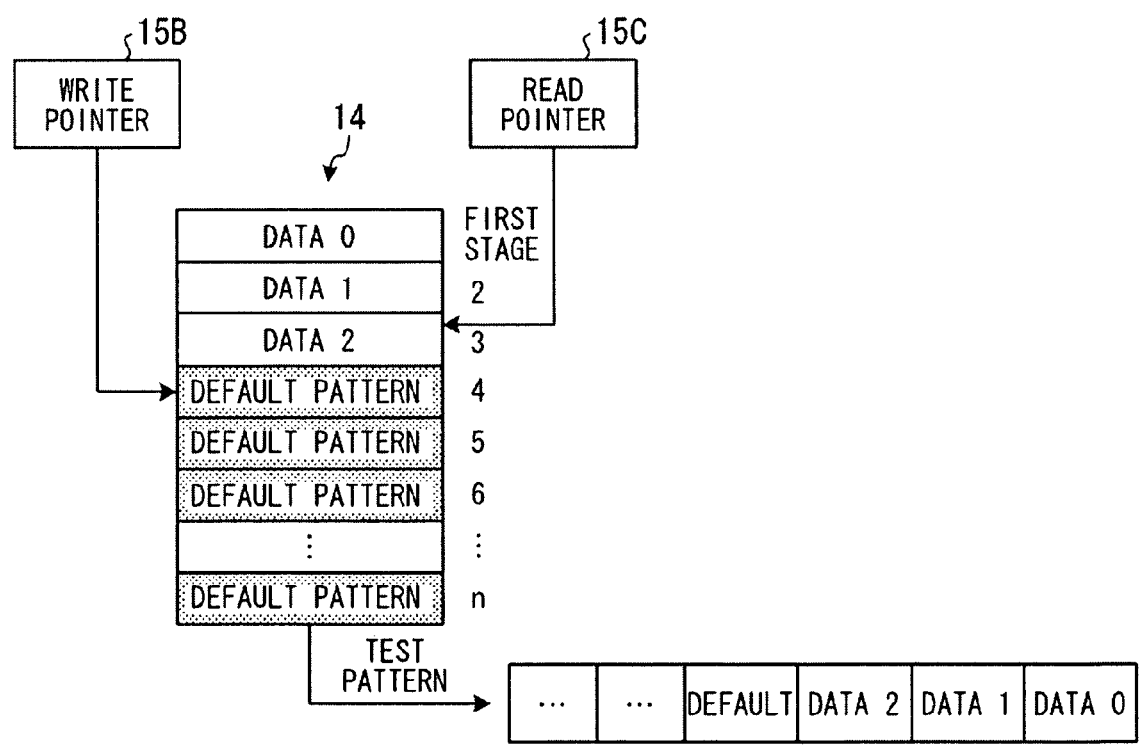
FIG. 8 is a diagram illustrating a test pattern read-out process associated with the test pattern register controller according to the first embodiment.

FIG. 8 is a diagram illustrating an example of the test pattern read-out process associated with the test pattern register controller 15 of the first embodiment. In the example of FIG. 8, test patterns registered in the test pattern register 14, containing a default test pattern, are read out from the first stage while incremented.

In FIG. 8, the test pattern register controller 15 successively reads out test patterns containing a default test pattern from plural test patterns being registered in the test pattern register 14, not singly, but in the order of the first stage, the second stage, the third stage, the fourth stage, and so on, and successively transmits the successively read-out plural test patterns to the data reception device 3.

In the test pattern read-out process illustrated in FIG. 8, the test patterns are successively read out in the order of the first stage, the second stage, the third stage, etc., and the retraining process is executed by using the successively read-out plural test patterns. Therefore, the circuit parameter of the high-precision and optimum data reception device 3 which is adaptive to not only the system environment temperature under current operation and the device production variation, but also the severe environment when the data error occurs can be adjusted and set.

In the test pattern read-out process shown in FIG. 8, the test patterns being registered in the test pattern register 14, containing the default test pattern, are successively read out in the order of the first stage, the second stage, the third stage, etc. However, the test patterns may be read out from the first stage of the test pattern register 14 every certain data length. For example, test patterns over a certain data length which are registered from the first stage to the third stage may be read out and output.

Figure 9:
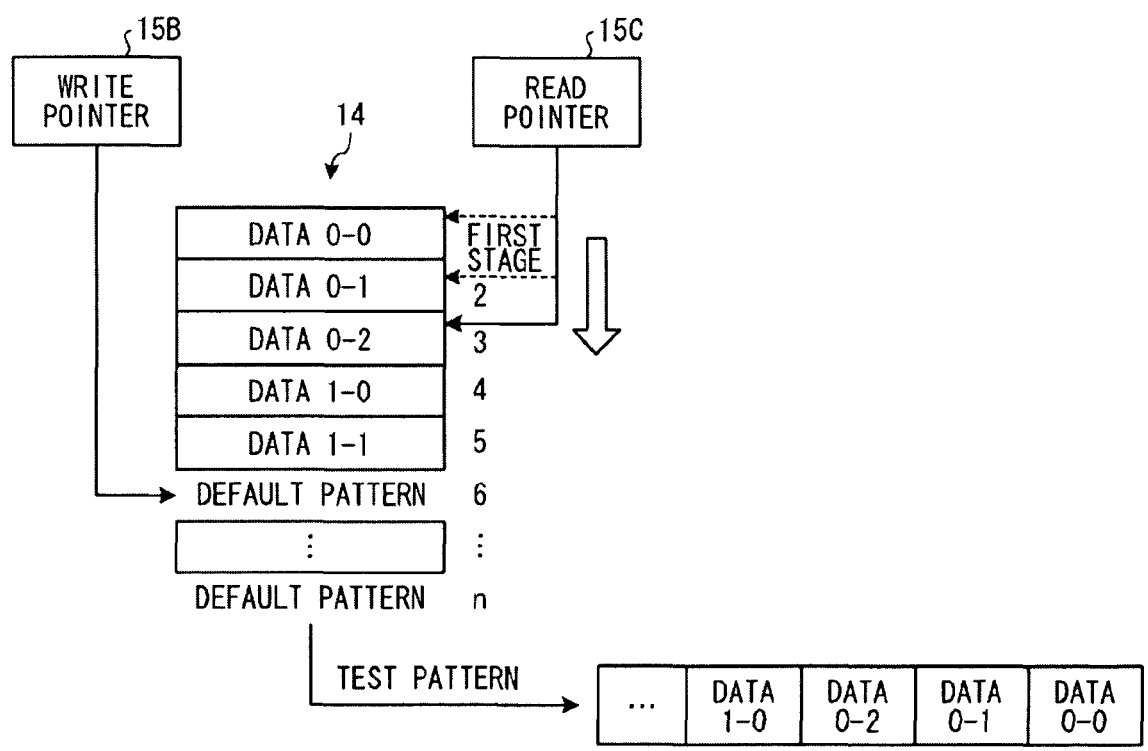
FIG. 9 is a diagram illustrating a test pattern read-out process associated with the test pattern register controller according to the first embodiment.

FIG. 9 is a diagram illustrating an example of the test pattern read-out process associated with the test pattern register controller 15 of the first embodiment. In the example of FIG. 9, test patterns registered in the test pattern register 14, excluding the default test pattern, are successively read out from the first stage while incremented.

In FIG. 9, the test pattern register controller 15 successively reads out test patterns excluding a default test pattern from plural test patterns being registered in the test pattern register 14, and successively transmits the successively read-out plural test patterns to the data reception device 3.

In the test pattern read-out process illustrated in FIG. 9, the test patterns excluding the default test pattern are successively read out, and the retraining process is executed by using the successively read-out test patterns. Therefore, the circuit parameter of the high-precision and optimum data reception device 3 which is adaptive to not only the system environment temperature under current operation and the device production variation, but also the severe environment when the data errors occur, can be adjusted and set.

In the data transmission system 1 of the first embodiment, the re-transmission data associated with when the data error is detected is registered as the test pattern in the test pattern register 14 of the data transmission device 2, and the re-transmission data received by the data reception device 3 is registered as the collation pattern corresponding to the test pattern in the collation pattern register 24 of the data reception device 3. When the data transmission device 2 detects the retraining signal, the test pattern being registered in the test pattern register 14 is transmitted to the data reception device 3. Furthermore, when the data reception device 3 receives the test pattern from the data transmission device 2, the data reception device 3 reads out the collation pattern corresponding to the test pattern from the collation pattern register 24, collates the test pattern and the collation pattern, and adjusts and sets the parameter of the data reception device 3 on the basis of the collation result. Therefore, according to the data transmission system 1 of the first embodiment, the re-transmission data associated with the case where the data error is detected under operation is used as the test pattern and the collation pattern used in the retraining process between the data transmission device 2 and the data reception device 3, whereby the circuit parameter of the optimum data reception device 3 which is adaptive to not only the system environment temperature under current operation and the device production variation, but also the severe environment in which the data error occur, can be adjusted and set. As a result, the system environment which is suitable for the high-speed data transmission can be implemented.

Furthermore, in the data transmission system 1 of the first embodiment, the re-transmission data corresponding to the data re-transmission request at the data error detection time is temporarily registered in the test pattern register 14. When the error dissolution notification of the re-transmission data from the data reception device 3 is detected, the re-transmission data being temporarily registered in the test pattern register 14 is registered as the test pastern. Therefore, according to the data transmission system 1 of the first embodiment, in the data transmission device 2, an optimum test pattern which is adaptive to not only the system environment temperature under current operation and the device production variation, but also the severe environment in which the data error occurs can be registered in the test pattern register 14.

Furthermore, in the data transmission system 1 of the first embodiment, when the data re-transmission request of the re-transmission data from the data reception device 3 is detected again while the re-transmission is temporarily registered in the test pattern register 14, the temporary registration of the re-transmission data is maintained without registering the re-transmission data being temporarily registered in the test pattern register 14. Therefore, according to the data transmission system 1 of the first embodiment, the re-transmission data whose data error cannot be dissolved can be prevented from being registered as the test pattern.

Furthermore, in the data transmission system 1 of the first embodiment, the re-transmission data corresponding to the data re-transmission request at the data error detection time is temporarily registered in the collation pattern register 24, and when no data error is detected in the re-transmission data, the re-transmission data being temporarily registered in the collation pattern register 24 is registered as the collation pattern. Therefore, according to the data transmission system 1 of the first embodiment, it is needless to say that the collation pattern which is adaptive to not only the system environment temperature under current operation and the device production variation, but also the severe environment in which the data error occurs can be definitively registered in the collation pattern register 14.

Figure 10:
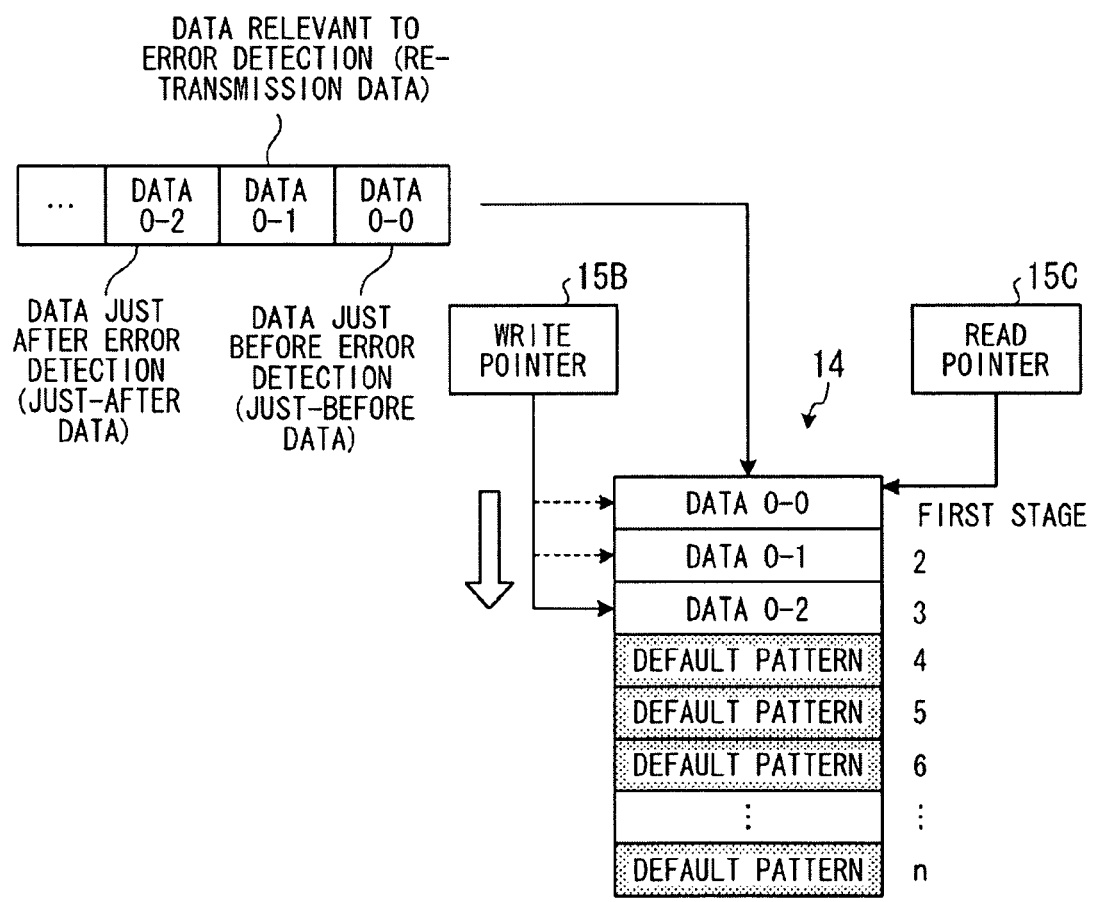
FIG. 10 is a diagram illustrating a test pattern read-out process associated with the test pattern register controller according to a second embodiment of the invention.

Next, the data transmission system 1 according to a second embodiment will be described. FIG. 10 is a diagram illustrating an example of the test pattern read-out process associated with the test pattern register controller 15 according to the second embodiment. In the example of FIG. 10, in addition to the re-transmission data, preceding and subsequent data which are sequential to the re-transmission data concerned are read out as a test pattern, and transmitted to the data reception device 2. The same elements as the data transmission system 1 of the first embodiment are represented by the same reference numerals, and the description of the duplicative elements and operation are omitted.

In FIG. 10, "data 0-1" is re-transmission data corresponding to data in which an error is detected. The data transmission device 2 transmits "data 0-0" to the data reception device 3 prior to the "data 0-1", and also transmits "data 0-2" to the data reception device 3 subsequently to the data "0-1". In the example of FIG. 10, the "data 0-0", the "data 0-1" and the "data 0-2" are registered as test patterns in the test pattern register 14. In FIG. 10, the "data 0-0" is registered at the first stage of the test pattern register 14, the "data 0-1" is registered at the second stage of the test pattern register 14, and the "data 0-2" is registered at the third stage of the test pattern register 14.

The data transmission system 1 of the second embodiment registers re-transmission data re-transmitted when the data error is detected, and data preceding the re-transmission data (herein after referred to as "preceding data") and data subsequent to the re-transmission data (hereinafter referred to as "subsequent data") containing normal data as test patterns into the test pattern register 14. In the data transmission system 1 of the second embodiment, the re-transmission data and the preceding data and the subsequent data are registered as the collation patterns in the collation pattern register 24 of the data reception device 3.

Figure 11:
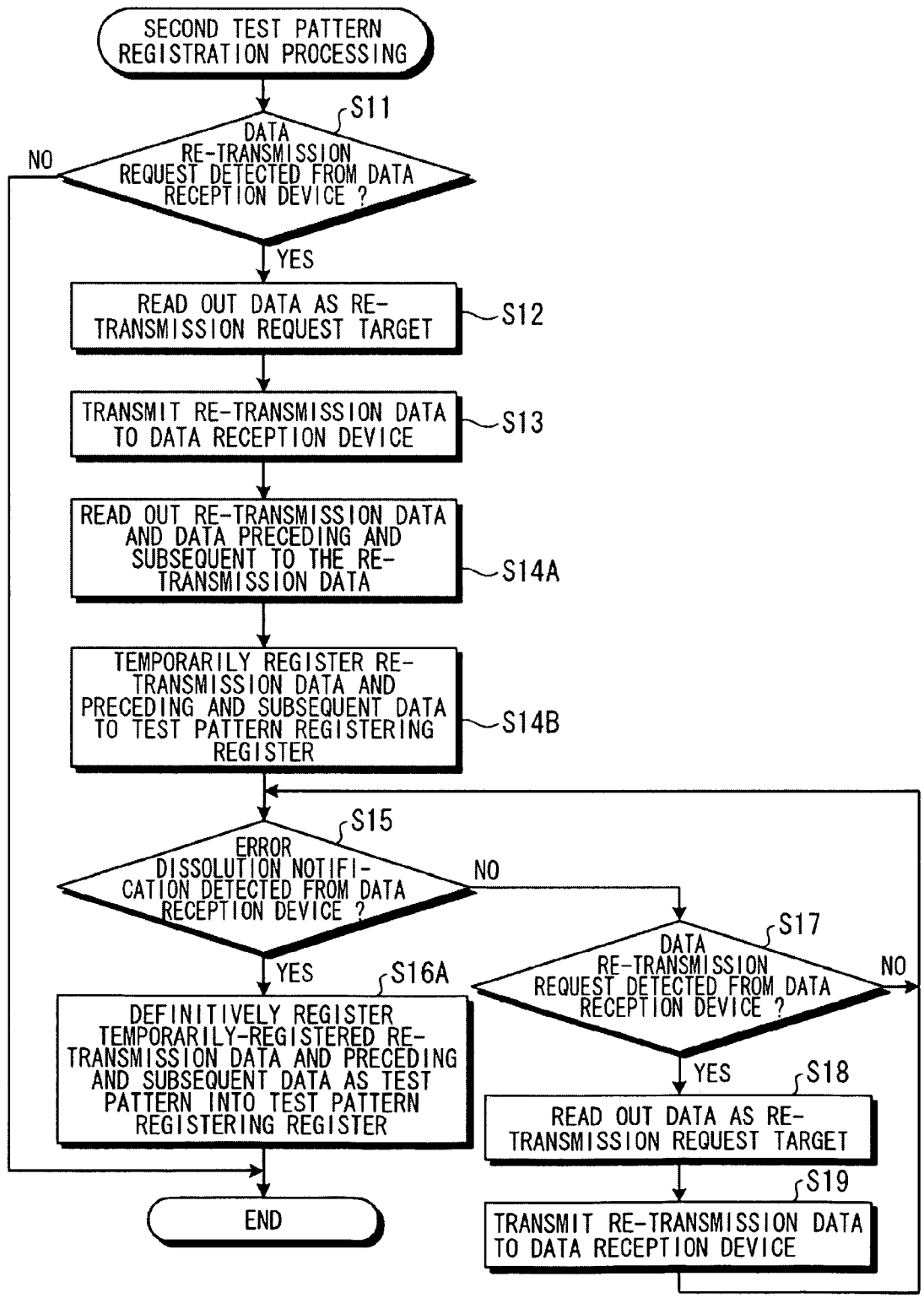
FIG. 11 is a flowchart illustrating an operation of a data transmission device involved with second test pattern registering processing according to the second embodiment.

The operation of the data transmission device 2 involved with the second test pattern registration process of the second embodiment will be described. FIG. 11 is a flowchart illustrating a process corresponding to an operation of the data transmission device 2 involved with the second test pattern registration process of the second embodiment.

In FIG. 11, the test pattern register controller 15 of the data transmission device 2 executes the process of S13, and then transmits the re-transmission data to the data reception device 3. Thereafter, the test pattern register controller 15 reads out, from the transmission data storing buffer 12, the re-transmission data and the preceding data and the subsequent data which are transmitted to the data reception device 3 (S14A). Thereafter, the test pattern register controller 15 temporarily registers the read-out re-transmission data, the preceding data and the subsequent data into the test pattern register 14 (S14B), and shifts the process to S15 in FIG. 11 to determine whether an error dissolution notification from the data reception device 3 is detected or not.

Furthermore, when an error dissolution notification from the data reception device 3 is detected (S15: Yes), that is, when the data reception device 3 does not detect any error in the re-transmission data, the test pattern register controller 15 registers the temporarily-registered re-transmission data and the preceding data and the subsequent data as test patterns (S16A) in the test pattern register 14, and then finishes the process of FIG. 11.

In the second test pattern registration process illustrated in FIG. 11, in addition to the re-transmission data corresponding to the data re-transmission request that is re-transmitted when the data error is detected, the data preceding and the data subsequent to the re-transmission data concerned are temporarily registered in the test pattern register 14. When the error dissolution notification of the re-transmission data from the data reception device 3 is detected, the temporarily registered re-transmission and the preceding data and the subsequent data in the test pattern register 14 are registered as test patterns. Therefore, in the data transmission device 2, the high-precision test patterns which are adaptive to not only the system environment temperature under current operation and the device production variation, but also the severe environment when the data error occurs can be definitively registered in the test pattern register 14.

Furthermore, in the second test pattern registration process, when the data re-transmission request of the re-transmission data is detected from the data reception device 3 again under the state that the re-transmission data and the preceding data and the subsequent data are temporarily registered in the test pattern register 14, the temporary registration is maintained without registering the re-transmission data and the preceding data and the subsequent data which are temporarily registered in the test pattern register 14. Therefore, the re-transmission data whose data error cannot be dissolved and the preceding/subsequent data can be prevented from being registered as the test pattern.

Figure 12:
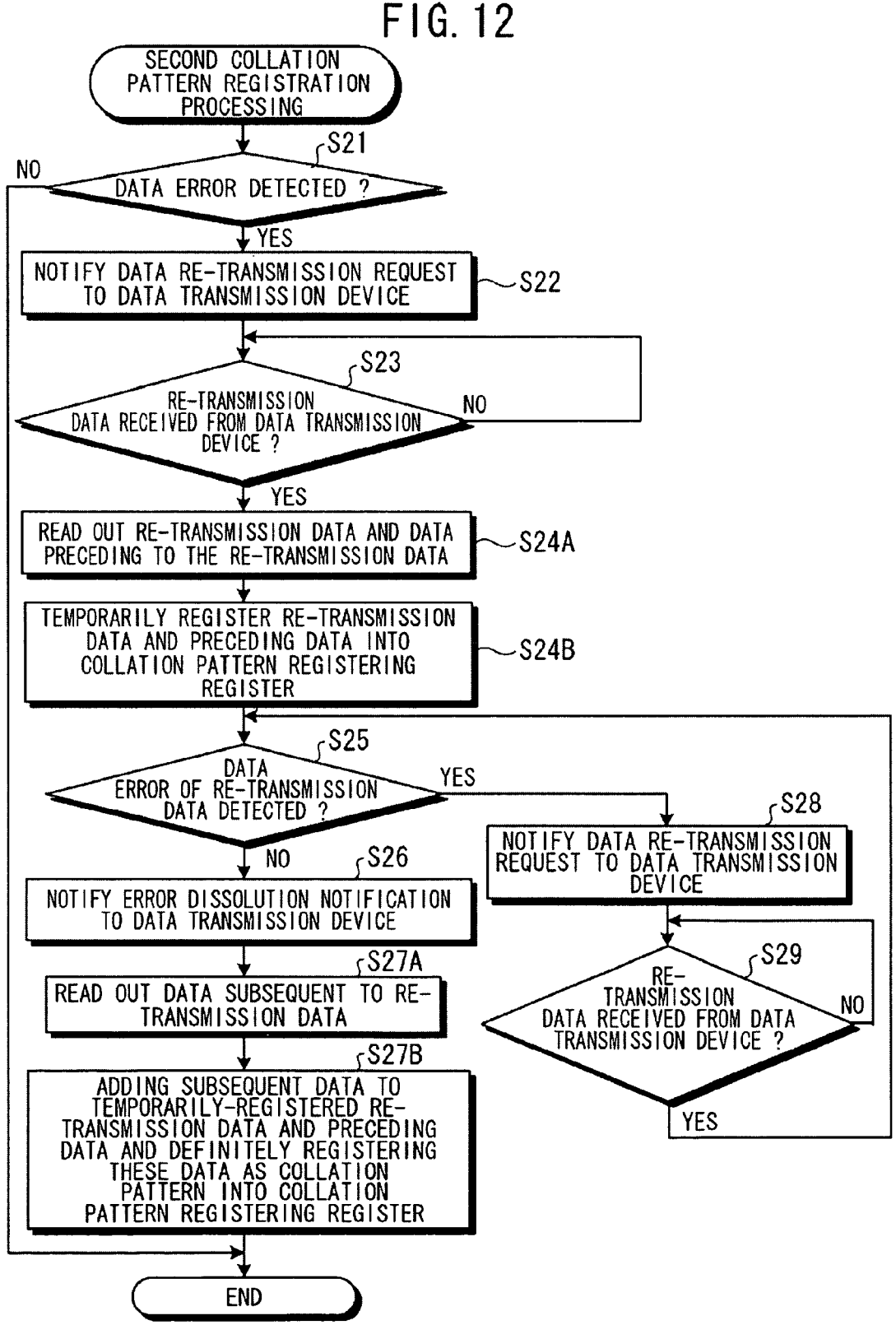
FIG. 12 is a flowchart illustrating an operation of a data reception device involved with second collation pattern registration processing according to the second embodiment.
Figure 13:
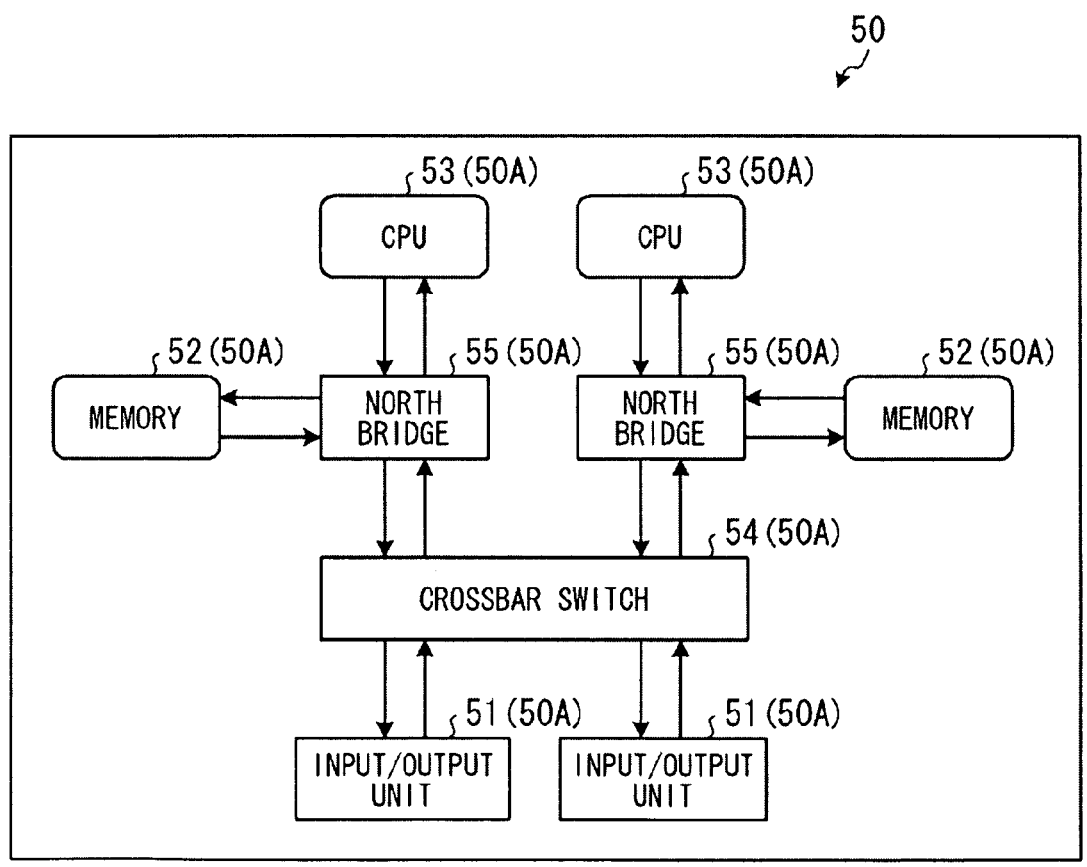
FIG. 13 is a block diagram illustrating electronic circuits in a general computer.
Figure 14:
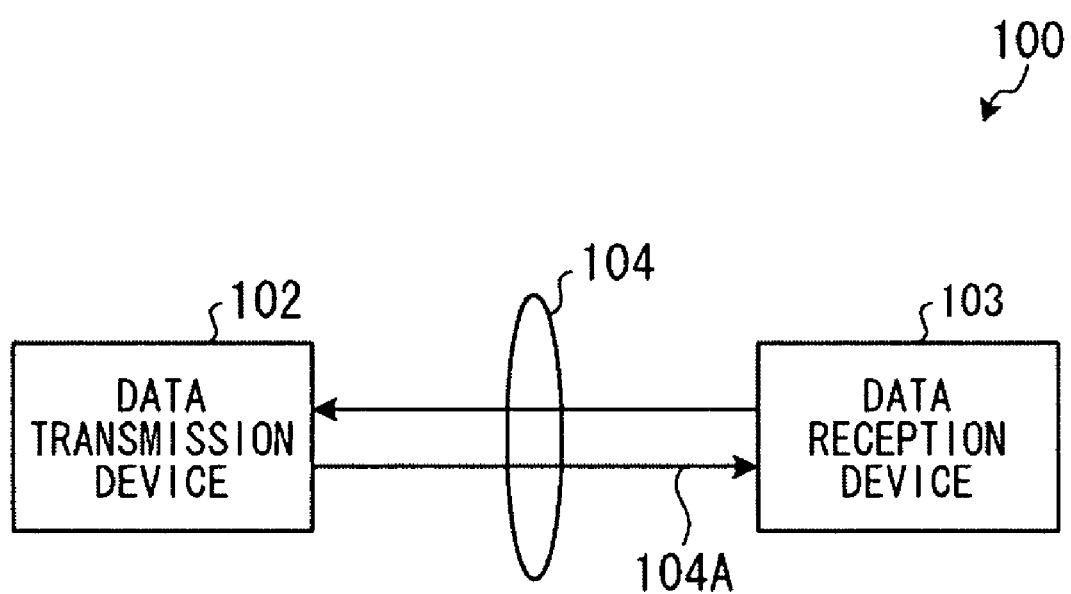
FIG. 14 is a block diagram in a data transmission system.

Next, the operation of the data reception device 3 involved with the second collation pattern registration process of the second embodiment will be described. FIG. 12 is a flowchart illustrating a process corresponding to an operation of the data reception device 3 involved with the second collation pattern registration process of the second embodiment.

In FIG. 12, the collation pattern register controller 25 of the data reception device 3 executes the process of S23, and then receives the re-transmission data from the data transmission device 2. Thereafter, the collation pattern register controller 25 reads out the data preceding the re-transmission data as well as the re-transmission data stored in the reception data storing buffer 21 (S24A). Then, the collation pattern register controller 25 temporarily registers the re-transmission data and the preceding data into the collation pattern register 24 (S24B), and shifts the process to S25 in FIG. 12 to determine whether an error of the re-transmission data is detected or not.

Furthermore, when the error determining unit 23A does not detect any error in the re-transmission data in S25, the collation pattern register controller 25 notifies the error dissolution notification of the re-transmission data to the data transmission device 2 in S26, and then reads out the data stored in the reception data storing buffer 21, that is, the data subsequently follows the re-transmission data temporarily registered in the collation pattern register 24 as subsequent data (S27A).

The collation pattern register controller 25 adds the subsequent data read out in S27A with the re-transmission data and the preceding data which is temporarily registered in the collation pattern register 24. Then, the collation pattern register controller 24 registers the re-transmission data, the preceding data and the subsequent data as collation patterns into the collation pattern register 24 (S27B), and then finishes the process operation of FIG. 12.

In the second collation pattern registration process illustrated in FIG. 12, the re-transmission data corresponding to the data re-transmission request sent when the data error is detected and the preceding data to the re-transmission data are temporarily registered in the collation pattern register 24. When no error of the re-transmission data is detected, the data next to the re-transmission data stored in the reception data storing buffer 21 is readout as subsequent data, and the re-transmission data and the preceding data which are temporarily registered in the collation pattern register 24 and the subsequent data are registered as collation patterns. Therefore, in the data reception device 3, the high-precision collation patterns which are adaptive to not only the system environment temperature under current operation and the device production variation, but also the severe environment when the data error occurs, can be definitively registered in the collation pattern register 24.

Furthermore, in the second collation pattern registering process, when a data error of the re-transmission data is detected under the condition that the re-transmission data and the preceding data are temporarily registered in the collation pattern register 24, the temporary registration is maintained without registering the re-transmission data and the preceding data which are temporarily registered in the collation pattern register 24. Therefore, the re-transmission data whose data error cannot be dissolved can be prevented from being registered as the collation pattern.

In the data transmission system 1 of the second embodiment, in addition to the re-transmission data associated when the data error is detected, the data preceding and subsequent to the re-transmission data concerned is registered as test patterns in the test pattern register 14 of the data transmission device 2, and the re-transmission data is registered as the collation pattern corresponding to the test pattern in the collation pattern register 24 of the data reception device 3. When the data transmission device 2 starts to execute the retraining process, the test pattern registered in the test pattern register 14 is transmitted to the data reception device 3, and also when the data reception device 3 receives the test pattern, the data reception device 3 reads out the collation pattern corresponding to the received test pattern from the collation pattern register 24, collates the test pattern with the collation pattern, and adjusts and sets the parameter of the data reception device 3 on the basis of the collation result. Therefore, according to the data transmission system 1 of the second embodiment, the re-transmission data associated when the data error is detected and the preceding and subsequent data to the re-transmission data are used as the test pattern and the collation pattern which are used in the retraining processing between the data transmission device 2 and the data reception device 3, whereby the circuit parameter of the optimum data reception device 3 which is adaptive to not only the system environment temperature under current operation and the device production variation, but also the severe environment when the data errors occur, can be adjusted and set. As a result, the system environment which is suitable for high-speed data transmission can be implemented.

In the first embodiment and the second embodiment, the test pattern register 14 for registering the test pattern and the collation pattern register 24 for registering the collation pattern are used, and when the number of registered patterns in the register exceeds n, the oldest pattern stored in the register is automatically deleted from the register. However, it is needless to say that the device may be provided with a function of locking the automatic deletion as described above.

In the first embodiment and the second embodiment, the test pattern register 14 registers the test patterns, and the collation pattern register 24 registers the collation patterns. However, it is needless to say that the patterns definitively registered in the register may be backed up in a memory whose content is not deleted even when the data transmission device 2 and the data reception device 3 are powered off.

In the first and second embodiments, when the execution of the retraining process is started, any test pattern in plural test patterns registered in the test pattern register 14 is read out, and the read-out test pattern is transmitted to the data reception device 3. However, for example, a function of monitoring the current system environment temperature at all times may be provided to the device. In this case, when the re-transmission data at the data error detection time is registered as the test pattern in the test pattern register 14, the current system environment temperature is also registered, and when the execution of the retraining process is started, the current system environment temperature is measured, and a test pattern nearest to the current system environment temperature is read out from plural test patterns registered in the test pattern register 14 on the basis of the measurement result and output. In this case, the high-precision retraining process which is suitable for the system environment temperature under current operation can be implemented.

In the first and second embodiments, the data transmission system for transmitting information between the electronic circuits in the computer are exemplified by using one electronic circuit containing the data transmission device 2 therein and the other electronic circuit containing the data reception device 3 therein. On the other hand, both the data transmission device 2 and the data reception device 3 may be provided in one electronic circuit, and both the data transmission device 2 and the data reception device 3 may be contained in the other electronic circuit. In this case, the same advantage can be obtained.

Furthermore, the first embodiment and the second embodiment are exemplified by using the data transmission system 1 that transmits information between the electronic circuits in the computer, however, the present invention is not limited to the computer. Various systems may be applied insofar as they have a data transmission function and a data reception function which implement the retraining process using test patterns.

Still furthermore, the first and second embodiments are exemplified by using the data transmission system 1 which connects the data transmission device 2 and the data reception device 3 through the data transmission line 4A in a wired connection style. However, the present invention may be applied to a data transmission system which connects the data transmission device 2 and the data reception device 3 in a wireless connection style.

The scope of the technical idea of the present invention is not limited by the above embodiments, and various embodiments can be executed without departing from the scope of the technical idea described in Claims. Furthermore, the effect of the present invention is not limited to the effects described with reference to the embodiments.

In various kinds of process described with reference to the above embodiments, all or a part of the process which is described as being automatically executed may be manually executed. Conversely, all or a part of the process which is described as being manually executed may be automatically executed. Furthermore, the process, the control procedure, the specific names and the information such as various kinds of data and parameters may be properly altered unless specifically described.

The elements of the respective devices shown in the figures are functionally and conceptually shown, and they are not necessarily physically constructed as being illustrated, and the specific styles of the respective embodiments are not limited to those illustrated in the figures.

Furthermore, all or any part of each kind of process executed in each device may be executed on CPU (Central Processing Unit), or microcomputer such as MPU (Micro Processing Unit), MCU (Micro Controller Unit), on a program analyzed and executed by CPU (or a microcomputer such as MPU, MCU) or on hardware based on wired logic.

The system described above can adjust and set the circuit parameter of the optimum data reception device which is adaptive to not only the system environment temperature under operation and the device production variation, but also the severe environment when the data error occurs, so that the system can achieve the effect of implementing the system environment suitable for high-speed data transmission.

What is claimed is:

1. A transmission system comprising:
a transmission device that transmits information; and
a reception device that receives information sent from the transmission device;
wherein the transmission device comprises:
a re-transmitting unit that re-transmits information associated with a re-transmission request sent from the reception device as re-transmission information to the reception device when the re-transmission request is detected;
a test pattern registering unit that stores the re-transmission information as a test pattern; and
a test pattern transmitting unit that transmits the test pattern stored in the test pattern registering unit to the reception device in accordance with a retraining signal, and
the reception device comprises:
an error determining unit that determines whether an error is detected in the information received from the transmission device or not;
a re-transmission requesting unit that requests the transmission device to re-transmit information in which an error is detected;
a collation pattern registering unit that stores the re-transmission information received from the transmission device as a collation pattern;
a pattern collating unit that reads out the collation pattern corresponding to the test pattern received from the test pattern transmitting unit from the collation pattern registering unit when the reception device received the test pattern, and collates the test pattern and the collation pattern; and
a parameter adjusting and setting unit that adjusts and sets a parameter of the reception device on the basis of a collation result of the pattern collating unit.

2. The transmission system according to claim 1, wherein when a re-transmission request from the reception device is detected, the test pattern registering unit temporarily registers re-transmission information corresponding to information associated with the detected re-transmission request as the test pattern, and
the collation pattern registering unit temporarily registers the re-transmission information received from the data transmission device as a collation pattern of the test pattern.

3. The transmission system according to claim 1, wherein when no error is detected in the re-transmission information from the data re-transmitting unit, the test pattern registering unit definitively registers the re-transmission data as the test pattern, and
when no error is detected in the re-transmission information from the transmission data, the collation pattern registering unit definitively registers the re-transmission data as a collation pattern of the test pattern.

4. The transmission system according to claim 2, wherein the data reception device further comprising:
an error dissolution notifying unit that notifies error dissolution to the transmission device when no error is detected in the re-transmission information from the data transmission device, wherein
the collation pattern registering unit definitively registers the re-transmission data as the collation pattern when no error is detected in the re-transmission information from the data transmission device, and
when the error dissolution from the reception device is detected, the test pattern registering unit determines that no error is detected in the re-transmission information, and thus definitively registers the re-transmission information as the test pattern.

5. The transmission system according to claim 1, wherein when an error is detected in the re-transmission information from the data transmission device, the re-transmission requesting unit requests the transmission device to re-transmit the information in which the error is detected,
when an error is detected in the re-transmission information from the transmission device, the test pattern registering unit inhibits the error-detected re-transmission information from being definitively registered as the test pattern, and
when an error is detected in the re-transmission information from the data transmission device, the collation pattern registering unit inhibits the error-detected re-transmission information from being definitively registered as a collation pattern of the test pattern.

6. The transmission system according to claim 4, wherein when an error is detected in the re-transmission information from the transmission device, the collation pattern registering unit inhibits the re-transmission information from being definitively registered as a collation pattern of the test pattern associated with the re-transmission information being temporarily registered, and
when a re-transmission request of the information from the reception device is detected, the test pattern registering unit determines that an error is detected in the re-transmission information from the transmission device, and inhibits the re-transmission information from being definitively registered as the test pattern associated with the re-transmission information being temporarily registered.

7. The transmission system according to claim 1, further comprising a transmission information storing unit that successively stores information which is successively transmitted to the reception device,
wherein the test pattern registering unit reads out the re-transmission information and preceding and subsequent information sequential to the re-transmission information from the transmission information storing unit, and registers the read-out preceding and subsequent information and the re-transmission information as the test pattern,
the reception device comprising a reception information storing unit that successively stores information which is successively received from the transmission device,
wherein the collation pattern registering unit reads out the re-transmission information and preceding and subsequent information sequential to the re-transmission information from the reception information storing unit and registers the read-out preceding and subsequent information and the re-transmission information as the collation pattern corresponding to the test pattern.

8. The transmission system according to claim 1, wherein the test pattern registering unit enables plural test patterns to be registered, and
the test pattern transmitting unit selects a certain test pattern from the plural test patterns registered in the test pattern registering unit in accordance with the retraining signal, and transmits the selected test pattern to the reception device.

9. The transmission system according to claim 8, wherein the test pattern registering unit enables plural test patterns to be registered, and
the test pattern transmitting unit selects the latest test pattern from the plural test patterns registered in the test pattern registering unit in accordance with the retraining signal, and transmits the latest test pattern to the reception device.

10. A transmission method for transmitting information between a transmission device and a reception device, the method comprising:
determining whether an error is detected in information received from the transmission device;
requesting the transmission device to re-transmit the error-detected information when an error is detected in the received information;
re-transmitting information corresponding to the re-transmission request as re-transmission information from the transmission device when the re-transmission request is detected;
registering the re-transmission information as a test pattern;
transmitting the registered test pattern to the reception device;
registering the re-transmission information received from the transmission device as a collation pattern;
reading out the collation pattern corresponding to the received test pattern, and collating the test pattern and the collation pattern when a test pattern is received from the transmission device, and
adjusting and setting a parameter of the reception device on the basis of a pattern collation result.

11. The transmission method according to claim 10,
wherein the registering the re-transmission information as a test pattern comprises temporarily registering re-transmission information corresponding to information associated with the detected re-transmission request as the test pattern when the re-transmission request is detected; and
the registering the re-transmission information received from the transmission device as a collation pattern comprises temporarily registering the re-transmission information received from the data transmission device as the collation pattern of the test pattern.

12. The transmission method according to claim 10, further comprising:
determining whether an error is detected in the re-transmission information,
wherein the registering the re-transmission information as a test pattern comprises definitively registering the re-transmission data as the test pattern when no error is detected in the re-transmission information; and
wherein the registering the re-transmission data received from the transmission device as a collation pattern comprises definitively registering the re-transmission data as the collation pattern when no error is detected in the re-transmission information.

13. The transmission method according to claim 11, further comprising:
determining whether an error is detected in the re-transmission information from the transmission device; and
notifying error dissolution to the transmission device when no error is detected in the re-transmission information,
wherein the registering the re-transmission data received from the transmission device as a collation pattern comprises definitively registering the re-transmission data as the collation pattern when no error is detected in the re-transmission information, and
wherein the registering the retransmission data as the test pattern comprises definitively registering the re-transmission information as the test pattern when the error dissolution is notified to the transmission device indicating that no error is detected in the re-transmission information.

14. The transmission method according to claim 10, further comprising:
  determining whether an error is detected in the re-transmission information from the transmission device;
  requesting the transmission device to re-transmit information in which the error is detected when the error is detected in the re-transmission information from the transmission device;
  inhibiting the re-transmission information in which the error is detected from being definitively registered as the test pattern when the error is detected in the re-transmission information from the transmission device; and
  inhibiting the re-transmission information in which the error is detected from being definitively registered as the collation pattern when the error is detected in the re-transmission information from the transmission device.

15. The transmission method according to claim 13, wherein
  when the determining determines that an error is detected in the re-transmission information from the transmission device, the registering the re-transmission data received from the transmission device as a collation pattern comprises inhibiting the re-transmission information from being definitively registered as the collation pattern of the test pattern associated with the re-transmission information being temporarily registered; and
  when a re-transmission request is detected, the registering of the re-transmission information as a test pattern comprises determining that an error is detected in the re-transmission information from the transmission device, and inhibiting the re-transmission information from being definitively registered as the test pattern associated with the re-transmission information being temporarily registered.

16. The transmission method according to claim 10, further comprising:
  successively storing information in a transmission information storing unit;
  successively transmitting the information stored in the transmission information storing unit to the reception device;
  reading out the re-transmission information and preceding and subsequent information sequential to the re-transmission information from the transmission information storing unit;
  registering the read-out preceding and subsequent information and the re-transmission information as the test pattern;
  successively storing information which is successively received from the transmission device in a reception information storing unit;
  reading out the re-transmission information and preceding and subsequent information sequential to the re-transmission information from the reception information storing unit; and
  registering the read-out preceding and subsequent information and the re-transmission information as the collation pattern corresponding to the test pattern.

17. The transmission method according to claim 10,
  wherein the registering the re-transmission information as the test pattern comprises registering plural test patterns; and
  the transmitting the registered test pattern to the reception device comprises selecting a certain test pattern from the registered plural test patterns in accordance with a retraining signal, and transmitting the selected test pattern to the reception device.

18. The transmission method according to claim 17,
  the transmitting the registered test pattern to the reception device comprises selecting a latest test pattern from the registered plural test patterns in accordance with the retraining signal, and transmitting the latest test pattern to the reception device.

19. A communication device for transmitting to a reception device comprising:
  a memory;
  a processor that executes a program including a procedure on the memory, the procedure including:
  re-transmitting, when detecting a re-transmission request from the reception device, a re-transmission information corresponding to the detected re-transmission request to the reception device as re-transmission information;
  registering the re-transmission information as a test pattern; and
  transmitting the test pattern to the reception device in accordance with a retraining signal.

20. A communication device for receiving information from a transmission device comprising:
  a memory;
  a processor that executes a program including a procedure on the memory, the procedure including:
  determining whether an error is detected in information received from the transmission device;
  requesting the transmission device to re-transmit error-detected information when an error is detected in the received information;
  registering re-transmission information associated with a re-transmission request of the information concerned from the transmission device as a collation pattern corresponding to a test pattern when the re-transmission information associated with the re-transmission request is received;
  collating the test pattern with the collation pattern that corresponds to the test pattern when the test pattern is received; and
  adjusting and setting a parameter of the reception device based on a result of the collating.

* * * * *